US012662258B2

(12) United States Patent
Simpri et al.

(10) Patent No.: US 12,662,258 B2
(45) Date of Patent: Jun. 23, 2026

(54) MOVABLE PLATFORMS FOR VEHICLE CAPTURE ASSEMBLIES AND RELATED DEVICES, ASSEMBLIES, SYSTEMS, AND METHODS

(71) Applicant: Northrop Grumman Systems Corporation, Falls Church, VA (US)

(72) Inventors: Emmanuel Simpri, Sterling, VA (US); Jack Purcell, Sterling, VA (US); Matthew Alan Michel, Oak Hill, VA (US); Michael J. Foster, Sterling, VA (US); Quentin Williams, Sterling, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 19/213,952

(22) Filed: May 20, 2025

(65) Prior Publication Data

US 2025/0282497 A1     Sep. 11, 2025

Related U.S. Application Data

(62) Division of application No. 17/990,245, filed on Nov. 18, 2022, now Pat. No. 12,338,006.

(51) Int. Cl.
*B64G 1/64* (2006.01)
(52) U.S. Cl.
CPC ................................. *B64G 1/6464* (2023.08)

(58) Field of Classification Search
CPC ................ F16F 1/128; F16F 2238/024; Y10T 403/32557; Y10T 403/32591
See application file for complete search history.

(56) References Cited

U.S. PATENT DOCUMENTS

| | | | |
|---|---|---|---|
| 3,268,091 A | 8/1966 | Melton |
| 3,508,723 A | 4/1970 | Warren |
| 3,526,372 A | 9/1970 | Fentress |
| 3,662,973 A | 5/1972 | Collins |
| 3,910,533 A | 10/1975 | Cheatham |
| 3,952,976 A | 4/1976 | Fletcher |
| 4,177,964 A | 12/1979 | Hujsak |

(Continued)

FOREIGN PATENT DOCUMENTS

| | | |
|---|---|---|
| CN | 104071357 B | 4/2016 |
| CN | 105501470 A | 4/2016 |

(Continued)

OTHER PUBLICATIONS

Translation of JP H08143000 A (Year: 1996).*

(Continued)

*Primary Examiner* — Joshua J Michener
*Assistant Examiner* — Ryan Andrew Yankey
(74) *Attorney, Agent, or Firm* — John A. Miller; Shumaker, Loop & Kendrick, LLP

(57) ABSTRACT

Movable platforms for use with a vehicle capture assembly of a capture vehicle and related devices, systems, and methods include floors with rotatable legs extending between the floors. The rotation of the legs relative to one or more of the floors enables the movable platform to move from an initial position to a displaced position as one or more of the floors move relative to each other.

10 Claims, 7 Drawing Sheets

(56)  References Cited

U.S. PATENT DOCUMENTS

| | | | |
|---|---|---|---|
| 4,219,171 A | 8/1980 | Rudmann | |
| 4,298,178 A | 11/1981 | Hujsak | |
| 4,381,092 A | 4/1983 | Barker | |
| 4,391,423 A | 7/1983 | Pruett | |
| 4,431,333 A | 2/1984 | Chandler | |
| 4,449,684 A | 5/1984 | Hinds | |
| 4,588,150 A | 5/1986 | Bock | |
| 4,657,211 A | 4/1987 | Fuldner | |
| 4,664,344 A | 5/1987 | Harwell | |
| 4,750,692 A | 6/1988 | Howard | |
| 4,860,975 A * | 8/1989 | Schliesing | B64G 1/646 |
| | | | 405/188 |
| 4,880,187 A | 11/1989 | Rourke | |
| 4,898,348 A | 2/1990 | Kahn | |
| 4,955,559 A | 9/1990 | Kaminskas | |
| 5,005,786 A | 4/1991 | Okamoto | |
| 5,040,749 A | 8/1991 | Johnson | |
| 5,094,410 A | 3/1992 | Johnson | |
| 5,104,070 A | 4/1992 | Johnson | |
| 5,125,601 A | 6/1992 | Monford, Jr. | |
| 5,169,094 A | 12/1992 | Maute | |
| 5,253,944 A | 10/1993 | Preston | |
| 5,299,764 A | 4/1994 | Scott | |
| 5,349,532 A | 9/1994 | Tilley | |
| 5,364,046 A | 11/1994 | Dobbs | |
| 5,372,340 A | 12/1994 | Ihara | |
| 5,429,328 A | 7/1995 | Dobbs | |
| 5,449,211 A | 9/1995 | Monford, Jr. | |
| 5,490,075 A | 2/1996 | Howard | |
| 5,511,748 A | 4/1996 | Scott | |
| 5,735,488 A | 4/1998 | Schneider | |
| 5,738,306 A | 4/1998 | Moss | |
| 5,803,407 A | 9/1998 | Scott | |
| 5,806,802 A | 9/1998 | Scott | |
| 5,813,632 A | 9/1998 | Taylor | |
| 6,017,000 A | 1/2000 | Scott | |
| 6,032,904 A | 3/2000 | Hosick | |
| 6,045,094 A | 4/2000 | Rivera | |
| 6,082,678 A | 7/2000 | Maute | |
| 6,264,145 B1 | 7/2001 | Maute | |
| 6,272,751 B1 | 8/2001 | McMeekin | |
| 6,275,751 B1 | 8/2001 | Stallard | |
| 6,296,207 B1 | 10/2001 | Tilley | |
| 6,299,107 B1 | 10/2001 | Kong | |
| 6,322,023 B1 | 11/2001 | Soranno | |
| 6,330,987 B1 | 12/2001 | Scott | |
| 6,354,540 B1 | 3/2002 | Lewis | |
| 6,378,810 B1 | 4/2002 | Pham | |
| 6,484,973 B1 | 11/2002 | Scott | |
| 6,523,784 B2 | 2/2003 | Steinsiek | |
| 6,565,043 B1 | 5/2003 | Wittmann | |
| 6,669,148 B2 | 12/2003 | Anderman | |
| 6,742,745 B2 | 6/2004 | Tchoryk | |
| 6,840,481 B1 | 1/2005 | Gurevich | |
| 6,843,446 B2 | 1/2005 | Scott | |
| 6,845,303 B1 | 1/2005 | Byler | |
| 6,866,232 B1 | 3/2005 | Finney | |
| 6,945,500 B2 | 9/2005 | Wingo | |
| 6,969,030 B1 | 11/2005 | Jones | |
| 7,070,151 B2 | 7/2006 | Ausilio | |
| 7,104,505 B2 | 9/2006 | Tchoryk | |
| 7,118,075 B2 | 10/2006 | Schubert | |
| 7,163,179 B1 | 1/2007 | Taylor | |
| 7,172,385 B2 | 2/2007 | Khajepour | |
| 7,207,525 B2 | 4/2007 | Bischof | |
| 7,216,833 B2 | 5/2007 | Ausilio | |
| 7,216,834 B2 | 5/2007 | Ausilio | |
| 7,240,879 B1 | 7/2007 | Cepollina | |
| 7,293,743 B2 | 11/2007 | Cepollina | |
| 7,370,834 B2 | 5/2008 | Scott | |
| 7,438,264 B2 | 10/2008 | Cepollina | |
| 7,461,818 B2 | 12/2008 | Ausilio | |
| 7,484,690 B2 | 2/2009 | Ausilio | |
| 7,513,459 B2 | 4/2009 | Cepollina | |
| 7,513,460 B2 | 4/2009 | Cepollina | |
| 7,543,779 B1 | 6/2009 | Lewis | |
| 7,575,199 B2 | 8/2009 | Ausilio | |
| 7,575,200 B2 | 8/2009 | Behrens | |
| 7,588,213 B2 | 9/2009 | Ausilio | |
| 7,611,096 B2 | 11/2009 | Ausilio | |
| 7,611,097 B2 | 11/2009 | Ausilio | |
| 7,624,950 B2 | 12/2009 | Ausilio | |
| 7,815,149 B1 | 10/2010 | Howard | |
| 7,823,837 B2 | 11/2010 | Behrens | |
| 7,828,249 B2 | 11/2010 | Ritter | |
| 7,857,261 B2 | 12/2010 | Tchoryk, Jr. | |
| 7,861,974 B2 | 1/2011 | Hays | |
| 7,861,975 B2 | 1/2011 | Behrens | |
| 7,992,824 B2 | 8/2011 | Tchoryk, Jr. | |
| 8,006,937 B1 | 8/2011 | Romano | |
| 8,006,938 B2 | 8/2011 | Behrens | |
| 8,016,242 B2 | 9/2011 | Baumann | |
| 8,052,092 B2 | 11/2011 | Atmur | |
| 8,056,864 B2 | 11/2011 | Hays | |
| 8,074,935 B2 | 12/2011 | Gryniewski | |
| 8,181,911 B1 | 5/2012 | Gryniewski | |
| 8,196,870 B2 | 6/2012 | Gryniewski | |
| 8,205,838 B2 | 6/2012 | Moorer, Jr. | |
| 8,226,046 B2 | 7/2012 | Poulos | |
| 8,240,613 B2 | 8/2012 | Ritter | |
| 8,245,370 B2 | 8/2012 | Ritter | |
| 8,333,347 B2 | 12/2012 | Ritter | |
| 8,412,391 B2 | 4/2013 | Paluszek | |
| 8,448,904 B2 | 5/2013 | Gryniewski | |
| 8,579,233 B2 | 11/2013 | Richardson | |
| 8,628,044 B2 | 1/2014 | Poulos | |
| 8,899,527 B2 | 12/2014 | Allen | |
| 9,108,747 B2 | 8/2015 | Roberts | |
| 9,284,073 B2 | 3/2016 | Bigelow | |
| 9,302,793 B2 | 4/2016 | Ghofranian | |
| 9,321,175 B2 | 4/2016 | Smith | |
| 9,399,295 B2 | 7/2016 | Roberts | |
| 9,434,485 B1 | 9/2016 | Lehocki | |
| 9,463,883 B2 | 10/2016 | Bigelow | |
| 9,527,607 B2 | 12/2016 | Celerier | |
| 9,573,703 B2 | 2/2017 | Celerier | |
| 9,610,686 B2 | 4/2017 | Song | |
| 9,809,327 B2 | 11/2017 | Rossettini | |
| 9,878,806 B2 | 1/2018 | Helmer | |
| 9,914,550 B1 | 3/2018 | Price | |
| 9,950,424 B2 | 4/2018 | Roberts | |
| 10,005,180 B2 | 6/2018 | Roberts | |
| 10,407,184 B2 | 9/2019 | Mori | |
| 10,577,130 B1 | 3/2020 | Parish | |
| 11,053,031 B2 | 7/2021 | Liu | |
| 11,104,459 B2 | 8/2021 | Sorensen | |
| 11,643,226 B1 * | 5/2023 | Markcity | B64G 1/223 |
| | | | 244/172.4 |
| 2001/0017337 A1 | 8/2001 | Holemans | |
| 2002/0063188 A1 | 5/2002 | Steinsiek | |
| 2003/0192995 A1 | 10/2003 | Tchoryk | |
| 2004/0026571 A1 | 2/2004 | Scott | |
| 2004/0245404 A1 | 12/2004 | Kerstein | |
| 2005/0001102 A1 | 1/2005 | Schubert | |
| 2005/0040282 A1 | 2/2005 | Wingo | |
| 2005/0103940 A1 | 5/2005 | Bischof | |
| 2005/0258311 A1 | 11/2005 | Scott | |
| 2006/0145023 A1 | 7/2006 | Babb | |
| 2006/0145024 A1 | 7/2006 | Kosmas | |
| 2006/0151671 A1 | 7/2006 | Kosmas | |
| 2007/0114334 A1 | 5/2007 | Ausilio | |
| 2007/0164164 A1 | 7/2007 | Cepollina | |
| 2007/0228219 A1 | 10/2007 | Behrens | |
| 2007/0228220 A1 | 10/2007 | Behrens | |
| 2008/0060460 A1 | 3/2008 | Smith | |
| 2008/0121759 A1 | 5/2008 | Behrens | |
| 2008/0237400 A1 | 10/2008 | Gryniewski | |
| 2008/0265098 A1 | 10/2008 | Connelly | |
| 2009/0001221 A1 | 1/2009 | Collyer | |
| 2009/0146011 A1 | 6/2009 | Ritter | |
| 2009/0173832 A1 | 7/2009 | Hays | |
| 2009/0173833 A1 | 7/2009 | Ritter | |
| 2011/0004717 A1 * | 1/2011 | Ritter | B64G 1/6462 |
| | | | 710/304 |

(56) References Cited

U.S. PATENT DOCUMENTS

| | | | |
|---|---|---|---|
| 2011/0008102 A1 | 1/2011 | Hays | |
| 2011/0121139 A1 | 5/2011 | Poulos | |
| 2011/0180670 A1 | 7/2011 | Ausilio | |
| 2011/0192936 A1 | 8/2011 | Knirsch | |
| 2012/0112009 A1 | 5/2012 | Gryniewski | |
| 2012/0286098 A1 | 11/2012 | Poulos | |
| 2012/0325972 A1 | 12/2012 | Gryniewski | |
| 2013/0103193 A1 | 4/2013 | Roberts | |
| 2013/0292516 A1 | 11/2013 | Celerier | |
| 2014/0027577 A1 | 1/2014 | Darooka | |
| 2014/0361123 A1 | 12/2014 | Celerier | |
| 2015/0008288 A1 | 1/2015 | Bigelow | |
| 2015/0008290 A1 | 1/2015 | Bigelow | |
| 2015/0053823 A1 | 2/2015 | Bigelow | |
| 2015/0097084 A1 | 4/2015 | Szabo | |
| 2015/0266595 A1* | 9/2015 | Ghofranian | B64G 1/2229 |
| | | | 244/172.4 |
| 2015/0314893 A1 | 11/2015 | Rembala | |
| 2016/0039543 A1 | 2/2016 | Roberts | |
| 2016/0039544 A1 | 2/2016 | Roberts | |
| 2016/0114912 A1* | 4/2016 | Vezain | B64G 1/6462 |
| | | | 244/172.6 |
| 2016/0257435 A1 | 9/2016 | Coraboeuf | |
| 2017/0113818 A1 | 4/2017 | Mori | |
| 2017/0129627 A1 | 5/2017 | Moro | |
| 2017/0342943 A1 | 11/2017 | Watts | |
| 2018/0087683 A1 | 3/2018 | Raven | |
| 2018/0118377 A1 | 5/2018 | Garber | |
| 2018/0148197 A1 | 5/2018 | Halsband | |
| 2018/0186476 A1 | 7/2018 | Poncet | |
| 2018/0251240 A1 | 9/2018 | Reitman | |
| 2018/0251242 A1 | 9/2018 | Gorakavi | |
| 2018/0297722 A1 | 10/2018 | Agathon-Burton | |
| 2018/0297723 A1 | 10/2018 | Sorensen | |
| 2019/0023420 A1 | 1/2019 | Nicholson | |
| 2019/0023421 A1 | 1/2019 | Nicholson | |
| 2019/0023422 A1 | 1/2019 | Nicholson | |
| 2020/0024011 A1* | 1/2020 | Isayama | B64G 1/6462 |
| 2020/0102102 A1* | 4/2020 | Liu | B64G 1/6462 |
| 2021/0086913 A1 | 3/2021 | Friedman | |
| 2024/0022189 A1* | 1/2024 | Usuku | B64G 1/64 |
| 2024/0336376 A1 | 10/2024 | Ainley | |

FOREIGN PATENT DOCUMENTS

| | | | | | |
|---|---|---|---|---|---|
| CN | 107697320 | A | 2/2018 | | |
| CN | 108860665 | A | 11/2018 | | |
| EP | 0541052 | A1 | 5/1993 | | |
| EP | 0937644 | A2 | 8/1999 | | |
| EP | 2134606 | A1 | 12/2009 | | |
| EP | 0741655 | B2 | 5/2010 | | |
| EP | 1654159 | B1 | 6/2010 | | |
| EP | 2522577 | A1 | 11/2012 | | |
| EP | 3083406 | B1 | 2/2017 | | |
| EP | 3156335 | A1 | 4/2017 | | |
| EP | 3186151 | A1 | 7/2017 | | |
| EP | 3248737 | B1 | 12/2018 | | |
| EP | 3647209 | A1 | 5/2020 | | |
| JP | H01282098 | A | 11/1989 | | |
| JP | H02182599 | A | 7/1990 | | |
| JP | H08143000 | A | * 6/1996 | | B64G 1/645 |
| JP | 2013121126 | A | 6/2013 | | |
| KR | 20000045602 | A | 7/2000 | | |
| KR | 101808553 | B1 | 12/2017 | | |
| WO | 2005110847 | A1 | 11/2005 | | |
| WO | 2005118394 | A1 | 12/2005 | | |
| WO | 2008109993 | A1 | 9/2008 | | |
| WO | 2014024199 | A1 | 2/2014 | | |
| WO | 2015190527 | A1 | 12/2015 | | |
| WO | 2016030890 | A1 | 3/2016 | | |
| WO | 2016181079 | A1 | 11/2016 | | |

OTHER PUBLICATIONS

DLR, iBOSS-intelligent Building Blocks for On-Orbit Satellite Servicing and Assembly; German Aerospace Center (DLR) Space Administration, 2017, 2 pages.

Fehse "Automated Rendezvous and Docking of Spacecraft", 15 pages, Cambridge University Press 2003.

IBOSS-a modular approach towards enhanced future space systems and flexibility, http://www.iboss-satellites.com/iboss/, http://exchange.ciros-engineering.com/download/public/iBOSS_IAC-2017.wmv.

Medina Alberto et al: "Towards a standardized grasping and refuelling on-orbit servicing for geo spacecraft", Acta Astronautica, Pergamon Press, Elmsford, GB, vol. 134, Jan. 19, 2017 (Jan. 19, 2017), pp. 1-10, XP029937659, ISSN: 0094-5765, DOI: 10. 1016/J. ACTAASTR0. 2017. 01. 022.

Medina et al., "Towards a standardized grasping and refuelling on-orbit servicing for geo spacecraft", Acta Astronautica, vol. 134, 2017, pp. 1-10.

Mukherjee, "Robotic Assembly of Space Assets; Architectures and Technologies" Future In-Space Operations (FISO) Teleconference, Jun. 27, 2018, 2018 NASA Jet Propulsion Laboratory California Institute of Technology, 41 pages.

Reintsema et al., "DEOS-The In-Flight Technology Demonstration of GermansRobotics Approach to Dispose Malfunctioned Satellites", 2010, 8 pages.

Sellmaier et al., "On-Orbit Servicing Missions: Challenges and Solutions for Spacecraft Operations", SpaceOps 2010 Conference, AIAA 2010-2159, 2010.

Translation of JP H08143000 A, submitted with IDS (Year: 1996).

Weise et al., "An Intelligent Building Blocks Concept for On-Orbit-Satellite Servcing", Turin, Italy, 4-6 Sep. 2-12, 8 pages.

* cited by examiner

MOVABLE PLATFORMS FOR VEHICLE CAPTURE ASSEMBLIES AND RELATED DEVICES, ASSEMBLIES, SYSTEMS, AND METHODS

CROSS-REFERENCE TO RELATED APPLICATIONS

This application is a continuation of U.S. patent application Ser. No. 17/990,245, filed Nov. 18, 2022, for "MOVABLE PLATFORMS FOR VEHICLE CAPTURE ASSEMBLIES AND RELATED DEVICES, ASSEMBLIES, SYSTEMS, AND METHODS," the disclosure of which is incorporated herein in its entirety by reference.

TECHNICAL FIELD

The present disclosure relates to systems, devices, assemblies, apparatus, and methods for vehicle (e.g., spacecraft) docking. In some embodiments, the present disclosure includes a probe movement feature, such as, for example, a movable platform, for use with vehicle capture assembly for engaging with an associated vehicle and related devices, systems, and methods.

BACKGROUND

Docking assemblies and devices may be utilized to mechanically connect two or more vehicles (e.g., spacecraft) to each other. Such spacecraft may be vehicles (e.g., self-propelled vehicles) designed for short-term space flights and/or may be configured to remain in space for a long period of time. The spacecraft may be intended to perform a specific function in a space mission, such as supplying resources to and/or altering the orbit of a target vehicle. In some instances, the spacecraft may be a space station, satellite, or another suitable structure.

The connection of two or more spacecraft may enable the transfer of resources from one spacecraft to another spacecraft. For example, a spacecraft may dock with a space station to deliver crew and resources. In another example, a spacecraft may dock with a satellite to perform maintenance and repair of one or more components of that satellite. In yet an additional example, a spacecraft may dock with another vehicle to provide a specific mission function, such as, for example, a descent to or an ascent from an astronomical body or to transfer to a select location for the mission.

Conceptualized methods of docking to spacecraft consist of complex mechanical implements. However, mechanical complexity that is present in many of the above designs, particularly complexity associated with multi-axis servo motor and robotic control systems, increases the likelihood of component failure, which can result in failure in the docking and maintenance process. Further, relative motion between the docked vehicles and applied to the vehicles and the docking assemblies may jeopardize the docking procedure and may also cause damage to one or more of the vehicles and their respective docking assemblies.

BRIEF SUMMARY

In some aspects, the disclosure described herein relates to a movable platform for use with a vehicle capture assembly of a capture vehicle, the movable platform including: a first floor configured to be coupled with a portion of the vehicle capture assembly proximate the capture vehicle; a second floor configured to be coupled with a probe assembly of the vehicle capture assembly; and at least one set of legs extending between the first floor and the second floor, the at least one set of legs being rotationally coupled to at least one of the first floor or the second floor and configured to rotate relative to the at least one of the first floor or the second floor; wherein rotation of the at least one set of legs relative to the at least one of the first floor or the second floor enables the movable platform to move from an initial position to a displaced position as the first floor translates laterally relative to the second floor in a direction transverse to a longitudinal axis of the movable platform.

In some aspects, the disclosure described herein relates to a movable platform for use with a vehicle capture assembly of a capture vehicle, the movable platform including: a first floor configured to be coupled proximate the capture vehicle; a second floor configured to be coupled with a probe assembly of the vehicle capture assembly; at least one set of legs extending between the first floor and the second floor, the at least one set of legs being rotationally coupled to at least one of the first floor or the second floor and configured to rotate relative to the at least one of the first floor or the second floor, wherein rotation of the at least one set of legs relative to the at least one of the first floor or the second floor enables the movable platform to move from an initial position to a displaced position as the first floor moves relative to the second floor in a lateral direction; and a floating stop configured to rotate when the at least one set of legs rotate in one rotational direction relative to the at least one of the first floor or the second floor.

In some aspects, the disclosure described herein relates to a vehicle capture system for use with a capture vehicle, the vehicle capture system including: a probe assembly including one or more retention elements for engaging with and securing a target vehicle; and a movable platform coupled to at least a portion of the probe assembly, the movable platform including: a first lateral section coupled with a portion of the capture vehicle; a second lateral section coupled with the probe assembly; and legs extending between the first lateral section and the second lateral section, the legs being rotationally coupled to at least one of the first lateral section or the second lateral section and configured to rotate relative to the at least one of the first lateral section or the second lateral section, wherein rotation of the legs relative to the at least one of the first lateral section or the second lateral section enables the movable platform to move from an initial position to a displaced position as the second lateral section translates relative to the first lateral section.

In some aspects, the disclosure described herein relates to a method of capturing a spacecraft, the method including: extending a probe of a vehicle capture assembly toward a target spacecraft on a boom, the vehicle capture assembly being coupled to a capture vehicle; enabling motion of the probe relative to the capture vehicle with a movable platform, a first lateral section of the movable platform coupled to the probe and a second lateral section of the movable platform coupled to the boom with rotatable legs extending between the first lateral section and the second lateral section, the enabling motion of the probe relative to the capture vehicle with the movable platform including: translating the first lateral section relative to the second lateral section by rotating the legs relative to the first lateral section and the second lateral section; and while translating the first lateral section relative to the second lateral section, substantially maintaining a rotational position of the probe; and engaging the probe of the vehicle capture assembly with the target spacecraft.

In some aspects, the disclosure described herein relates to a method of moving a vehicle capture assembly of a capture vehicle with a movable platform, the method including: minimizing deadband in the movable platform by securing the movable platform in an initial position with a biasing mechanism and enabling the movable platform to move to a displaced position when a force threshold is exceeded; and once the force threshold is exceeded, translating a first lateral section of the movable platform coupled to the vehicle capture assembly relative to a second lateral section of the movable platform coupled to the capture vehicle by rotating rotatable legs of the movable platform relative to the first lateral section and the second lateral section, the rotatable legs extending between the first lateral section and the second lateral section.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
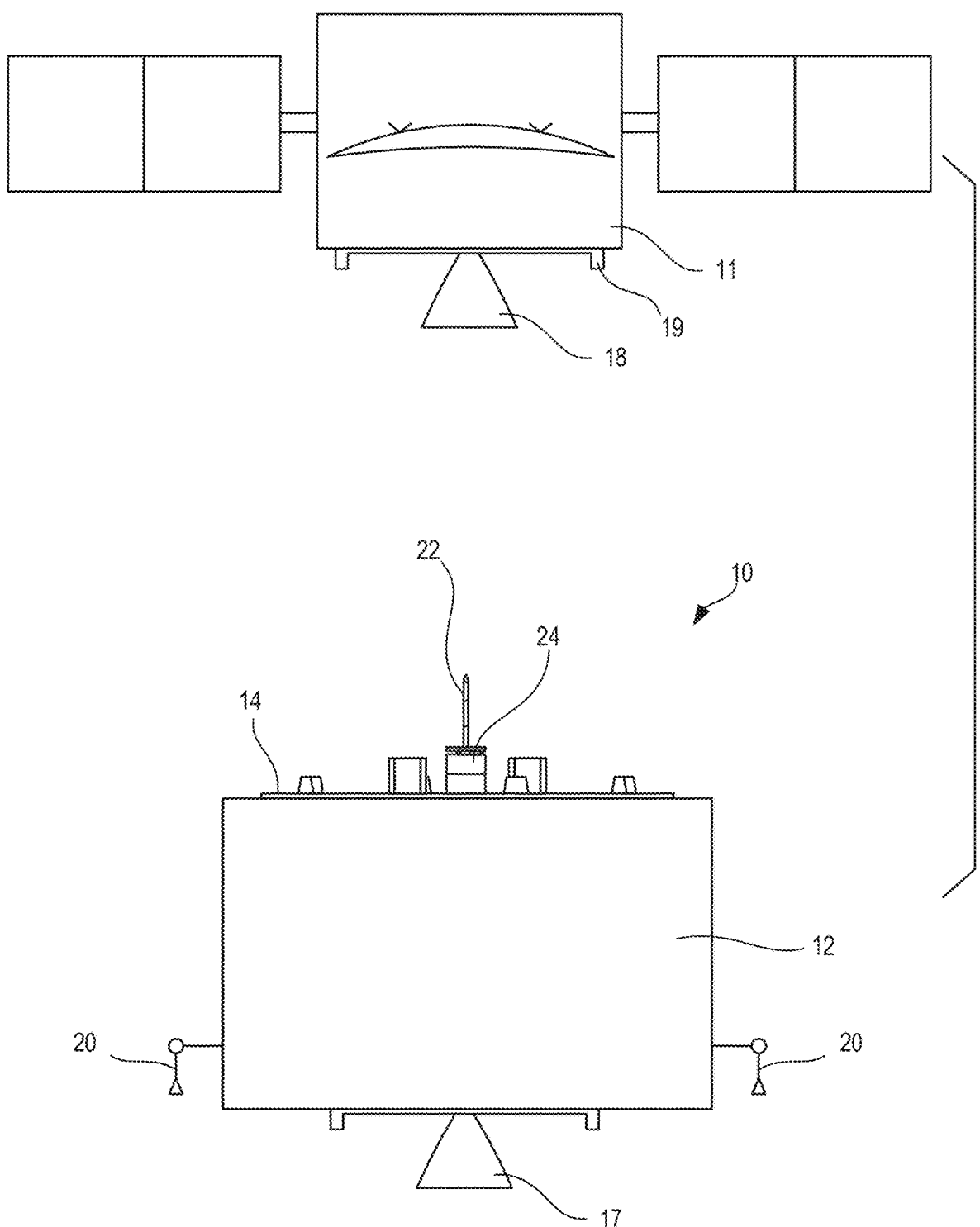
FIG. 1 is a schematic side view of a capture vehicle with a vehicle capture assembly and a target vehicle according to one or more embodiments of the disclosure.

While the disclosure is amenable to various modifications and alternate forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure.

DETAILED DESCRIPTION

As used herein, the terms "substantially," "about," and "approximate," in reference to a given parameter, means and includes to a degree that one skilled in the art would understand that the given parameter, property, or condition is met with a small degree of variance, such as within acceptable manufacturing tolerances. For example, a parameter that is substantially, about, or approximately met may be at least about 90% met, at least about 95% met, at least about 99% met, or even 100% met.

Embodiments of the present disclosure may include movable platforms for use with capture and mating assemblies and systems used for mechanical docking of two or more vehicles (e.g., spacecraft in orbit, with or without self-propulsion), using one or more vehicle capture device or assembly on the capture vehicle. Such vehicle capture assemblies are configured to engage with a docking portion of a target vehicle to be captured (e.g., one or more docking cones coupled to the target vehicle). Some embodiments may enable the autonomous capture and docking of spacecraft with relatively large mass and inertia, while incurring minimal disturbance to either vehicle. Some embodiments provide benefits in the form of a relatively simple and compact docking architecture with mechanical compliance for improved reliability and safety, that is, preventing damage to the spacecraft.

Some embodiments of the present disclosure may include a movable platform having movable joints or unions (e.g., rotational joints) enabling the docking assembly to move relative to a capture vehicle on which the docking assembly is mounted. For example, the movable platform may include multiple sections (e.g., floors, lateral members, plates) that move relative to each other (e.g., lateral or radial movement in a direction that is transverse to a longitudinal axis of the assembly) of the docking assembly. Such a configuration may enable the lateral movement of the floors through rotation of the legs while keeping the floors substantially parallel to each other. In some embodiments, the rotation of the legs between multiple floors may act as a parallelogram-type movement (e.g., a double parallelogram-type movement) where each set of legs with opposing floors on either side of the legs defines a substantial parallelogram shape. Stated in another way, the rotation of the legs between multiple floors may move enable lateral movement between the floors while maintaining the floors in a substantially parallel orientation.

In some embodiments, the movement of the legs may minimize (e.g., substantially prevent) rotation of the floors of the docking assembly relative to each. For example, such a configuration may substantially prevent rotation of the floors relative to each other with the legs or unions between the floors while enabling the lateral movement of the floors through rotation of the legs and keeping the floors substantially parallel to each other.

Embodiments of the disclosure enable angular displacement of one or more sets of legs that, in turn, enable lateral displacement of the floors relative to each other. At least some of the floors may attached to components of a vehicle capture system. For example, the floors may be attached, on one end of the movable platform, to a docking assembly and, on another end of the movable platform, to spacecraft (e.g., a chaser or capture vehicle).

Embodiments of the movable platform may include a biasing mechanism (e.g., springs, such as torsion springs). For example, the biasing mechanism may resist deflection for loads that are below a threshold level (e.g., about 1 N, 2 N, or more or less depending on the application) while enabling deflection once the threshold level is overcome. Once the threshold level is overcome, additional force may be required to continue moving the movable platform. For example, the deflection may increase as the loading (e.g., lateral loading) increases. The restorative nature of the biasing mechanism may assist to minimize any offset between the capture vehicle and the target vehicle during a capture and docking operation as the biasing mechanism tends to force the movable platform back to the initial position.

In some embodiments, the biasing mechanism may include a floating stop that acts to center the movable platform in an initial position and to force the movable platform back toward the initial position after a displacement. The use of the biasing mechanism including the floating stop may minimize or even eliminate deadband (e.g., play or slop) during movement of the movable platform between an initial position and a displaced position. For example, the biasing force acting on the floors via the legs may act to secure the flooring in the initial position until the threshold force is overcome enabling the floors to move while reducing or eliminating any unwanted movement (e.g., play) between the floors.

Embodiments of the movable platform may include linkages or legs (e.g., pairs of linkages or legs extending between floors). The legs rotate relative to pinned joints on each floor, enabling the floors to move relative to one another. Embodiments of the movable platform may utilize redundant revolute joints at the pinned linkage joints in order to reduce fault caused by friction as compared to alternative compliance devices. For example, if one revolute joint is to fail (e.g., via binding, galling, etc.) the other joint may continue to operate under substantially normal conditions. In some embodiments, further reduction in friction, if desired, may be enabled through the use of rolling element bearings (e.g., ball bearings). A centering mechanism comprised of redundant torsion springs and one or more floating stops allows the mechanism to return to the nominal, centered position after an initial displacement of one or both of the movable platform floors. Preloads in the torsion springs also allow the mechanism to resist motion (e.g., substantially prevent) for loads less than a specific threshold.

In operation in space, a target vehicle and chaser vehicle generally cannot be perfectly aligned via rendezvous and proximity operations prior to docking operations. Compliance features in the docking mechanism may enable the successful completion of the docking operation and accommodate misalignments between the two vehicles. Embodiments of the movable platform may provide lateral compliance between the target vehicle and chaser vehicle in a relatively simple and compact manner by enabling lateral displacements of the docking mechanism relative to the chaser vehicle while reducing disturbances to the vehicles. The centering biasing mechanism may assist in removing misalignment between the two vehicles during the docking operation. Embodiments of the movable platform may be unique in that the movable platform utilizes redundant revolute joints, which enables greater fault tolerance (e.g., to friction-type failures) as compared to many similar solutions that tend to bind during use. Further, the movable platform may provide a compliance feature that may be packaged into a relatively shorter and more compact length along the boom as compared to other solutions.

In some embodiments, the biasing mechanism of the movable platform may act as attenuation elements or features to assist in dampening movement of the docking assembly (e.g., with the target vehicle at least partially coupled thereto) relative to the capture vehicle. Such docking assemblies may provide initial compliance for soft capture and/or may at least partially attenuate relative motion between the vehicles (e.g., before retraction of the docking assembly to a final rigidized connection).

FIG. 1 depicts a schematic side view in which a capture vehicle 10 (e.g., a servicing vehicle, a chaser spacecraft, a transfer spacecraft, etc.) may be operated to approach, capture, dock to, supply, transfer cargo or resources to, and/or service a target vehicle 11, according to one or more embodiments of the disclosure.

Capture vehicle 10 and target vehicle 11 each may be a spacecraft or a satellite situated in orbit around a body. The capture vehicle 10 may be a spacecraft designed to approach, capture, dock to, and undock from the target vehicle 11. Docking of the capture vehicle 10 to target vehicle 11 may enable a specific function in a space mission. For example, the connection of the vehicles 10, 11 may enable the transfer of resources (e.g., cargo, equipment, passengers, crew, etc.) from one vehicle to another vehicle, may enable vehicle repair, and/or may enable a specific mission function (e.g., a descent to or an ascent from an astronomical body or to transfer to a select location in space for the mission).

Capture vehicle 10 may be designed to dock with more than one target vehicle 11. For example, the capture vehicle 10 may be provided with a docking mechanism (e.g., vehicle capture assembly 22) that enables the capture vehicle 10 to dock and undock from multiple target vehicles 11. The capture vehicle 10 may be configured to dock with one or more of the target vehicles 11 comprising one or more docking elements 18 (e.g., a docking cone, an engine, etc.).

As discussed below in greater detail, the vehicle capture assembly 22 may include a movable platform 24 including one or more attenuation elements or features to assist in enabling movement of the vehicle capture assembly 22 relative to the capture vehicle 10 while also dampening such movement of the vehicle capture assembly 22 (e.g., with the target vehicle 11 at least partially coupled thereto) relative to the capture vehicle 10. The vehicle capture assembly 22 and the movable platform 24 may provide initial compliance for soft capture of the target vehicle 11 and/or may at least partially attenuate relative motion between the vehicles 10, 11 (e.g., before retraction of the vehicle capture assembly 22 to a final rigidized connection).

In some embodiments, the movable platform 24 may be passive. For example, the movable platform 24 may function in a manner that does not require the use of active components such as a motor directly actuating the movable platform 24 (e.g., is not required to be driven in an active manner). The movable platform 24 may use passive methodology or mechanisms, such as mechanical forces (e.g., biasing members, dampening mechanisms, etc.) to enable movement of the vehicle capture assembly 22. In additional embodiments, the movable platform 24 may include active (e.g., actively driven) components enabling and/or regulating motion in one or more of the degrees of freedom.

As depicted, the capture vehicle 10 may include a spacecraft body 12, a docking platform 14, a main thruster 17, gimbaled thrusters 20, and the vehicle capture assembly 22. As noted above, the vehicle capture assembly 22 may include retention elements that directly contact and secure the target vehicle 11 in a manner that does not require the use of active components such as a motor directly actuating the retention elements. Rather, the retention elements may use passive methodology or mechanisms, such as mechanical forces (e.g., biasing forces), to engage with the target vehicle 11.

As discussed below, while a motor (e.g., only a single and solitary motor) may be used to actively move (e.g., translate) the vehicle capture assembly 22 toward and/or away from the target vehicle 11, such a motor may only indirectly contribute to the engagement and/or disengagement of the retention elements. For example, while the motor may place the retention elements in a selected position relative to the target vehicle, a force applied to the vehicle capture assembly 22 may be utilized to engage and/or disengage the retention elements (e.g., a force overcoming one or more biasing elements of the vehicle capture assembly 22) in a passive manner that is not actively driven by a motor or an otherwise electronic device.

Target vehicle 11 may be a spacecraft to be captured by the vehicle capture assembly 22 of the capture vehicle 10. Target vehicle 11 may be in low earth orbit, medium earth orbit, geosynchronous orbit, beyond geosynchronous orbit, or in another orbit around an astronomical body, for example, such as Earth, a moon, or another planetary body. Target vehicle 11 may include the docking element 18 and a separation ring 19.

Vehicle capture assembly 22 of capture vehicle 10 may be configured to capture target vehicle 11 at docking element 18 and to pull target vehicle 11 and capture vehicle 10 together for docking. When docked, one or more portions of the target vehicle 11 and/or vehicle capture assembly 22 may abut and retain the vehicles 10, 11 together.

Figure 2:
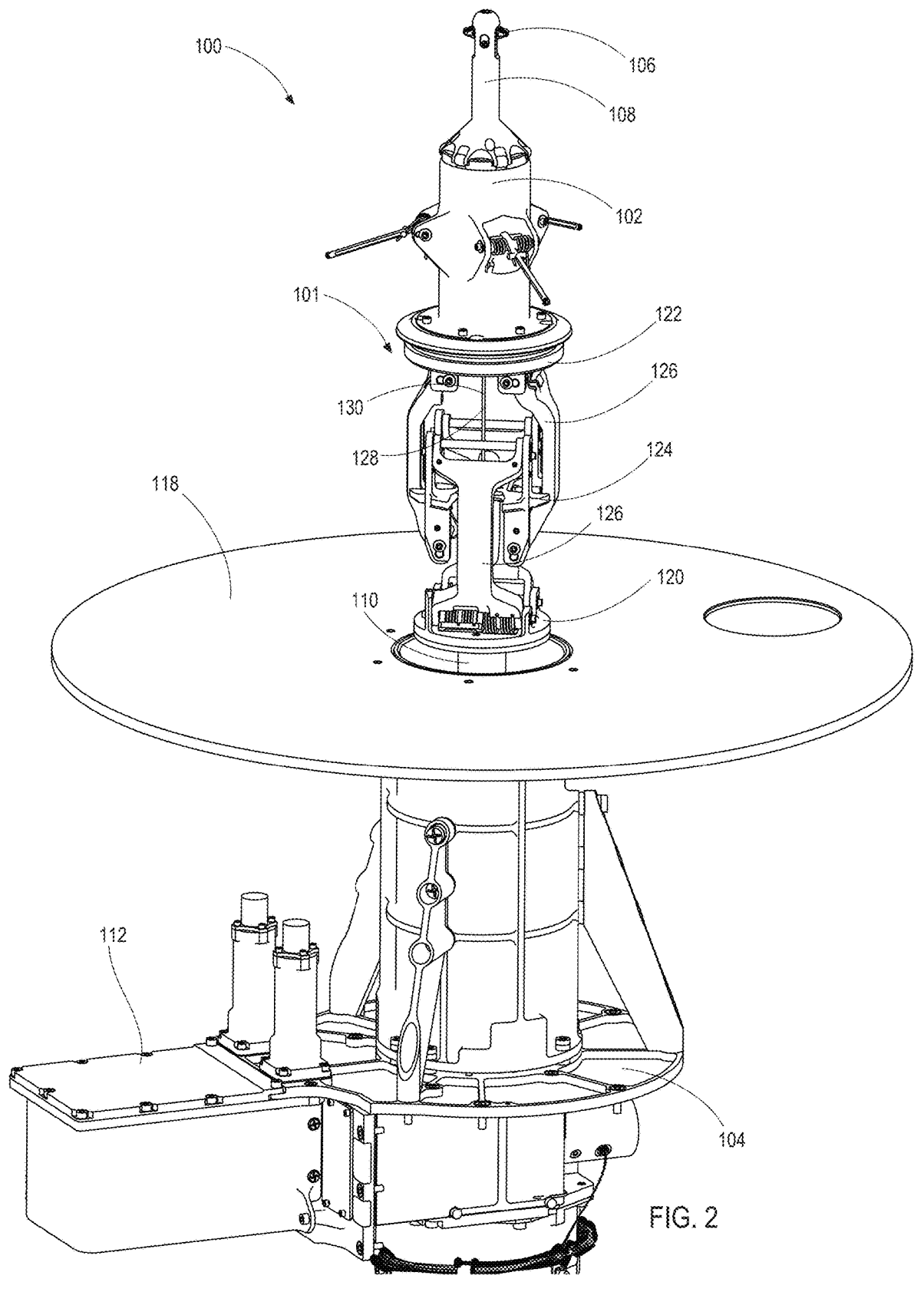
FIG. 2 is an isometric view of a vehicle capture assembly in an initial position according to one or more embodiments of the disclosure.

FIG. 2 depicts an isometric view of a vehicle capture assembly 100 in an initial position that may be used with a capture vehicle. In some embodiments, vehicle capture assembly 100 may be similar to, and include similar components and features of, the vehicle capture assembly 22 of the capture vehicle 10 which is depicted schematically in FIG. 1 and discussed above. In some embodiments, the vehicle capture assembly may be similar to that disclosed in U.S. patent application Ser. No. 17/207,646, filed Mar. 20, 2021, published as US 2021/0339893 A1, and/or U.S. patent application Ser. No. 15/829,807, filed Dec. 10, 2017, issued as U.S. Pat. No. 11,104,459, the disclosure of each of which is incorporated herein in its entirety by reference.

As shown in FIG. 2, the vehicle capture assembly 100 includes a probe or probe assembly 102 coupled to a lance or lance assembly 104 (e.g., coupled via a movable platform 101 at a distal portion or end of the lance assembly 104). The probe assembly 102 includes one or more retention features (e.g., barbs 106) that extend from the probe assembly 102 at a location proximate a probe tip 108. The barbs 106 may extend in a direction transverse to a length or longitudinal axis of one or more portions of the vehicle capture assembly 100 (e.g., lateral to a length of the lance assembly 104). As depicted, the rotatable barbs 106 extend laterally outward and in a proximal direction toward the lance assembly 104 in order to capture a target vehicle 11 (FIG. 1).

In some embodiments, the barbs 106 may be biased (e.g., spring-loaded) in a selected position. For example, the barbs 106 may be in the depicted deployed position where the barbs 106 may couple with a portion of the target vehicle 11 (FIG. 1). In additional embodiments, the barbs 106 may be biased in a retracted or stowed position.

Referring to FIGS. 1 and 2, the lance assembly 104 may include functionality that enables extension and/or retraction of a portion of the probe assembly 102 to facilitate docking of capture vehicle 10 with target vehicle 11. For example, when capture vehicle 10 is positioned proximate to the target vehicle 11, the probe assembly 102 may be extended to and inserted into the docking element 18 of the target vehicle 11 with the lance assembly 104. The lance assembly 104 may include a lance boom 110 that is driven by a motor 112 of the probe assembly 102. The motor 112 may be used to actively move (e.g., translate) the lance boom 110 toward and/or away from the target vehicle 11.

In some embodiments, the motor 112 may only indirectly contribute to the engagement and/or disengagement of the barbs 106. For example, while the motor 112 may place the barbs 106 in a selected position relative to the target vehicle 11, force applied to the barbs 106 (e.g., to overcome the biasing force of the barbs 106 into the deployed position)

may be applied as the barbs 106 are inserted into the docking element 18 to engage the barbs 106 in a passive manner that is not actively driven by the motor 112. As discussed below, movement of the probe assembly 102 (e.g., by forcing the probe assembly 102 into the target vehicle 11) may be used to release the barbs 106 from the target vehicle 11 (e.g., by overcoming the biasing forces of the barbs 106 in a different manner with internal components of the probe assembly 102).

The vehicle capture assembly 100 may include a backstop plate 118 for mating with a portion of the target vehicle 11 (e.g., the docking element 18 in the captured position).

As depicted, the vehicle capture assembly 100 includes a probe movement feature (e.g., a movable platform 101). In some embodiments, the movable platform 101 may be similar to the movable platform 24 discussed above.

As depicted, the movable platform 101 may include floors at opposing ends of the movable platform 101 (e.g., a first end floor 120 and a second end floor 122). For example, the first end floor 120 may be coupled (e.g., rigidly coupled in a substantially immovable manner) to the capture vehicle 10 (FIG. 1). The second end floor 122 may be coupled (e.g., rigidly coupled) to the vehicle capture assembly 100 (e.g., to the probe assembly 102).

The second end floor 122 may be movably coupled to the first end floor 120 via one or more movable unions or joints to enable the second end floor 122 to move relative to both the first end floor 120 and the capture vehicle 10. Each of the movable unions (e.g., linkages, legs 126, etc.) may provide at least one degree of freedom of movement between the second end floor 122 and the first end floor 120. As discussed above, the movable unions may limit movement between the second end floor 122 and the first end floor 120 to primarily translational movement (e.g., lateral, side-to-side translation in a direction transverse to a direction of movement of the lance assembly 104) while keeping the second end floor 122 and the first end floor 120 in an orientation substantially parallel to each other.

As depicted, an intermediate floor 124 may be positioned between the first end floor 120 and the second end floor 122. Sets of legs 126 may extend between each of the floors 120, 122, 124 and the legs 126 may rotate relative to two of the respective floors 120, 122, 124 to which each leg 126 is connected (e.g., via a rotational joint, such as a pinned union). Rotation of the legs 126 may respectively enable each of the floors 120, 122, 124 to move laterally relative to each other in a lateral direction or axis and/or radial direction or axis that is transverse (e.g., substantially perpendicular) to a longitudinal axis of the lance assembly 104 along which the lance boom 110 moves.

In some embodiments, the movable platform 101 may include central openings to accommodate a central lanyard 128 (e.g., housed within a flexible conduit 130) extending through the movable platform 101. The central lanyard 128 and accompanying flexible conduit 130 may both be bendable to accommodate movement of the floors 120, 122, 124 of the movable platform 101. The central lanyard 128 may be coupled to and act to move the barbs 106. For example, the central lanyard 128 may pull on the barbs 106 to retract the barbs 106 and release the target vehicle 11.

Figure 3:
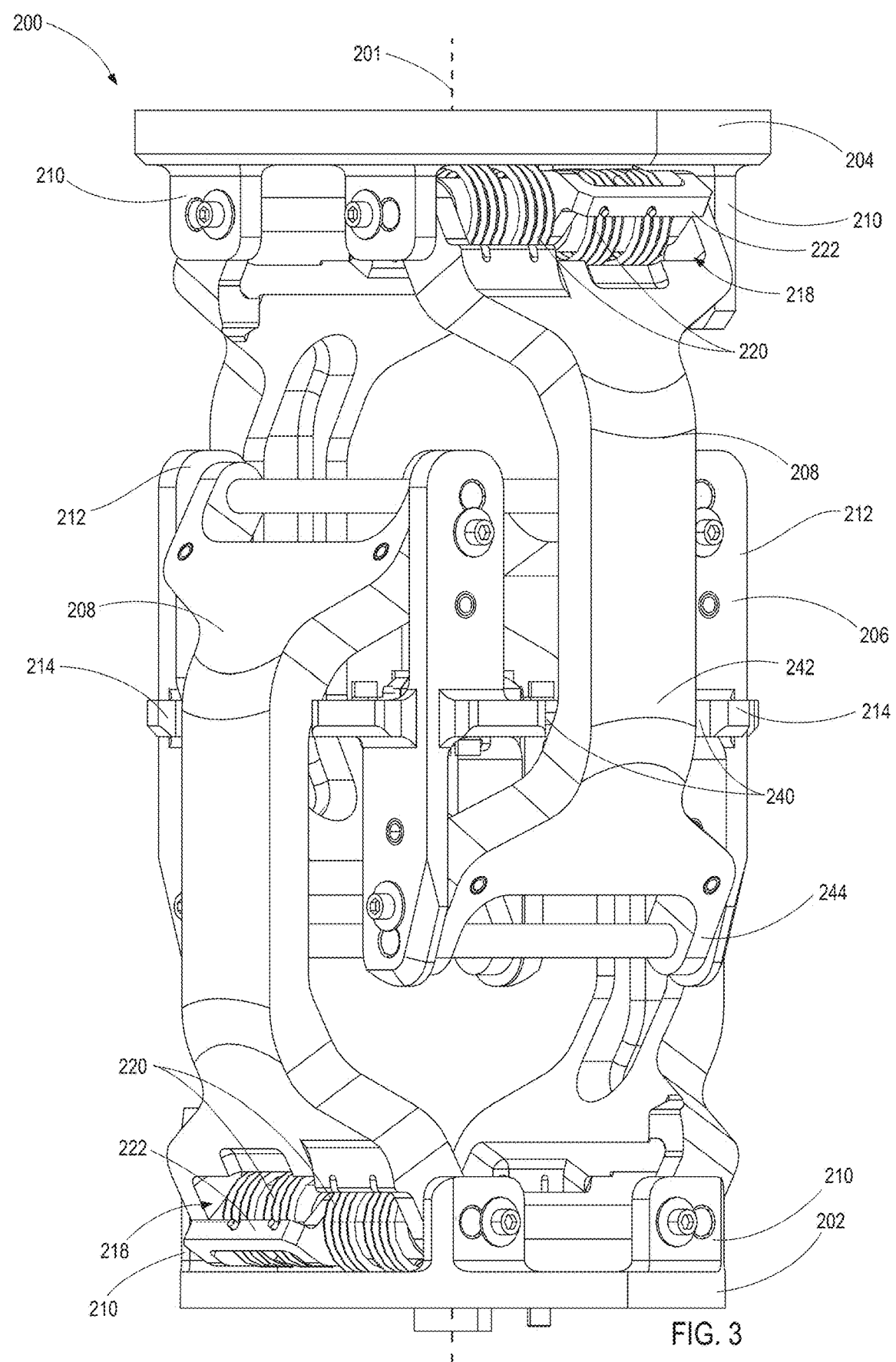
FIG. 3 is an isometric view of a movable platform (e.g., a probe movement feature) in an initial position according to one or more embodiments of the disclosure.

FIG. 3 is an isometric view of a movable platform 200. In some embodiments, the movable platform 200 may be similar to the movable platforms 24, 122 discussed above.

As depicted, the movable platform 200 may include end members, sections, or plates (e.g., a first floor 202 and a second floor 204) where one of the first floor 202 or the second floor 204 may be coupled (e.g., rigidly coupled) to the capture vehicle 10 (FIG. 1) while the other is coupled to at least a portion of the vehicle capture assembly 100 (FIG. 2).

The second floor 204 may be movable (e.g., primary translatable) relative to the first floor 202 via one or more movable unions or legs 208 to enable the second floor 204 to move relative to both the first floor 202 and the capture vehicle 10 in a direction transverse to (e.g., substantially perpendicular to) a longitudinal axis 201 or centerline of the movable platform 200. The movable unions or legs 208 may provide at least one degree of freedom of movement (e.g., substantially lateral translational movement) between the second floor 204 and the first floor 202. For example, the movable platform 200 may include the first floor 202 coupled to the second floor 204 via the legs 208 to enable the vehicle capture assembly 100 to translate along a lateral axis of movement as the floors 202, 204 move laterally relative each other.

As depicted, an intermediate structure or central member (e.g., at least one intermediate floor 206) may be positioned between the first floor 202 and the second floor 204. Legs 208 may extend between each of the floors 202, 204, 206. For example, a first set of the legs 208 (e.g., two radially opposing legs 208) may extend between the first floor 202 and the intermediate floor 206 and a second set of the legs 208 may extend between the second floor 204 and the intermediate floor 206. The first set of the legs 208 may be offset from the second set of the legs 208 (e.g., offset about 180 degrees about the longitudinal axis 201). As discussed below, in some embodiments, the first and second sets of legs 208 may partially overlap along the longitudinal axis 201 such that the first and second sets of legs 208 coextend along a portion of the longitudinal axis 201 while being coupled at opposite ends of the intermediate floor 206 to define an at least partially nested structure.

The legs 208 may rotate relative to two of the respective floors 202, 204, 206 to which each leg 208 is connected (e.g., via a rotational joint, such as a pinned union). Rotation of the legs 208 may respectively enable each of the floors 202, 204, 206 to move in a lateral direction that is transverse (e.g., substantially perpendicular) to the longitudinal axis 201. Floors 202, 204 may include brackets 210 extending from one side of the respective floor 202, 204. Intermediate floor 206 may include brackets 212 extending from both sides of a central structure 214 of the intermediate floor 206. The brackets 212 and the legs 208 may be configured such that the legs 208 may respectively couple with brackets 212 positioned relatively further away from the brackets 210 on the other floor 202, 204 to which the leg 208 is coupled. For example, a central portion of the legs 208 (e.g., central rib 242) may be rounded or curved to pass around the central structure 214 of the intermediate floor 206 to couple with a distal set of brackets 212. As noted above, such a configuration enable the legs 208 to overlap along the longitudinal axis 201 to define a nested structure (e.g., a relatively more compact structure).

The movable platform 200 may include one or more biasing mechanisms 218 to bias the movable platform 200 in an initial position (e.g., as shown in FIG. 3). As depicted, the biasing mechanism 218 may comprise torsion springs 220 positioned between one or more of the legs 208 and a respective one of the floors 202, 204, 206. While the biasing mechanism 218 is discussed herein primarily as torsion springs 220, in additional embodiments, other biasing mechanisms may be implemented (e.g., dampening mechanisms, differing spring configurations, etc.).

In some embodiments, the biasing mechanism 218 may include a set of torsion springs 220 positioned at an interface or union between a leg 208 and respective bracket 210 of the floors 202, 204. As depicted, only one leg 208 of each set may include the torsion springs 220 positioned at the outer end floors 202, 204. In additional embodiments, the torsion springs 220 may be positioned on one or more of the legs 208 at the union with the intermediate floor 206 (e.g., as shown in FIG. 2).

As discussed above, the torsion springs 220 (e.g., along with a floating stop 222, which is described in detail below) may bias the movable platform 200 in the initial position as depicted in FIG. 3. The torsion springs 220 may act to return the movable platform 200 substantially to the initial position after a force applied to the movable platform 200 causes the legs 208 to rotate in order displace to one or more of floors 202, 204, 206. As also discussed above, the torsion springs 220 may secure the floors 202, 204, 206 until a threshold force (e.g., 1 N, 2 N, etc.) is applied to or between one or more of the floors 202, 204, 206. Once the threshold force is exceeded, one or more sets of the legs 208 may begin to rotate enabling one or more of the floors 202, 204, 206 to move relative to each other. In such an embodiment, the torsion springs 220 (e.g., along with the floating stop 222) may substantially prevent any movement (e.g., slop) in the floors 202, 204, 206 until the threshold force is applied. For example, the torsion springs 220 and/or the floating stop 222 may act to minimize or eliminate any deadband in the movement of the floors 202, 204, 206. Once the threshold force is applied, the legs 208 may enable translation of one or more of floors 202, 204, 206 to move.

In some embodiments, rotation of the legs 208 may be limited by a hardstop provided by the movable platform 200. For example, a portion of the intermediate floor 206 (e.g., cutout portion 240) may contact the central rib 242 of the legs 208 (e.g., between bracket portions 244 at either end of the leg 208) to provide a hardstop for rotation of the legs 208 and translation of one or more of the floors 202, 204, 206.

As noted above, in some embodiments, the biasing mechanisms disclosed herein may act to attenuate movement during a docking procedure. For example, the biasing features may dampen transitional forces between the vehicles 10, 11 (FIG. 1) as the docking assembly 100 is inserted in a docking cone of the target vehicle 11.

Figure 4:
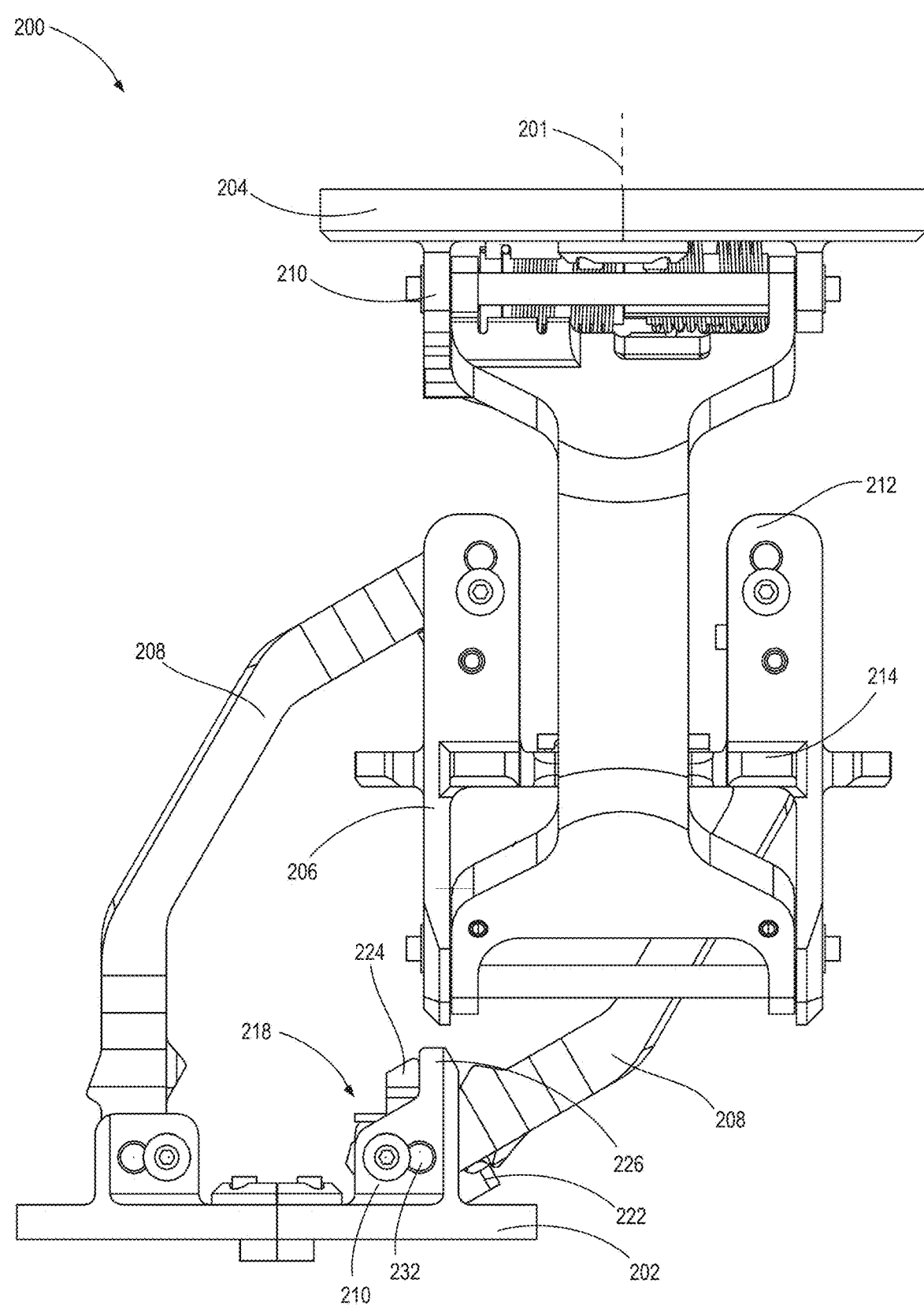
FIGS. 4 and 5 are side views of a movable platform in displaced positions according to one or more embodiments of the disclosure.
Figure 5:
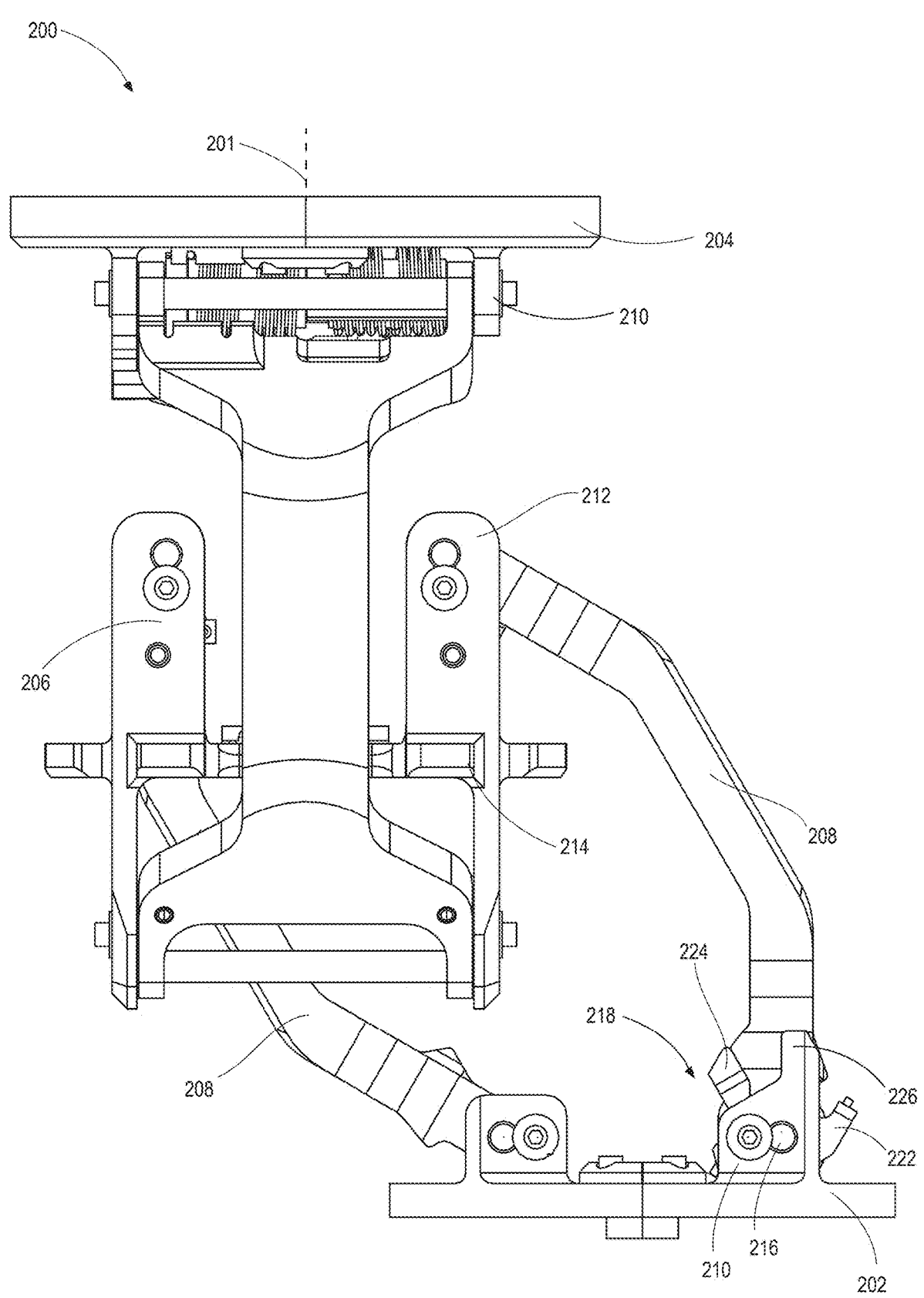
Figure 8:
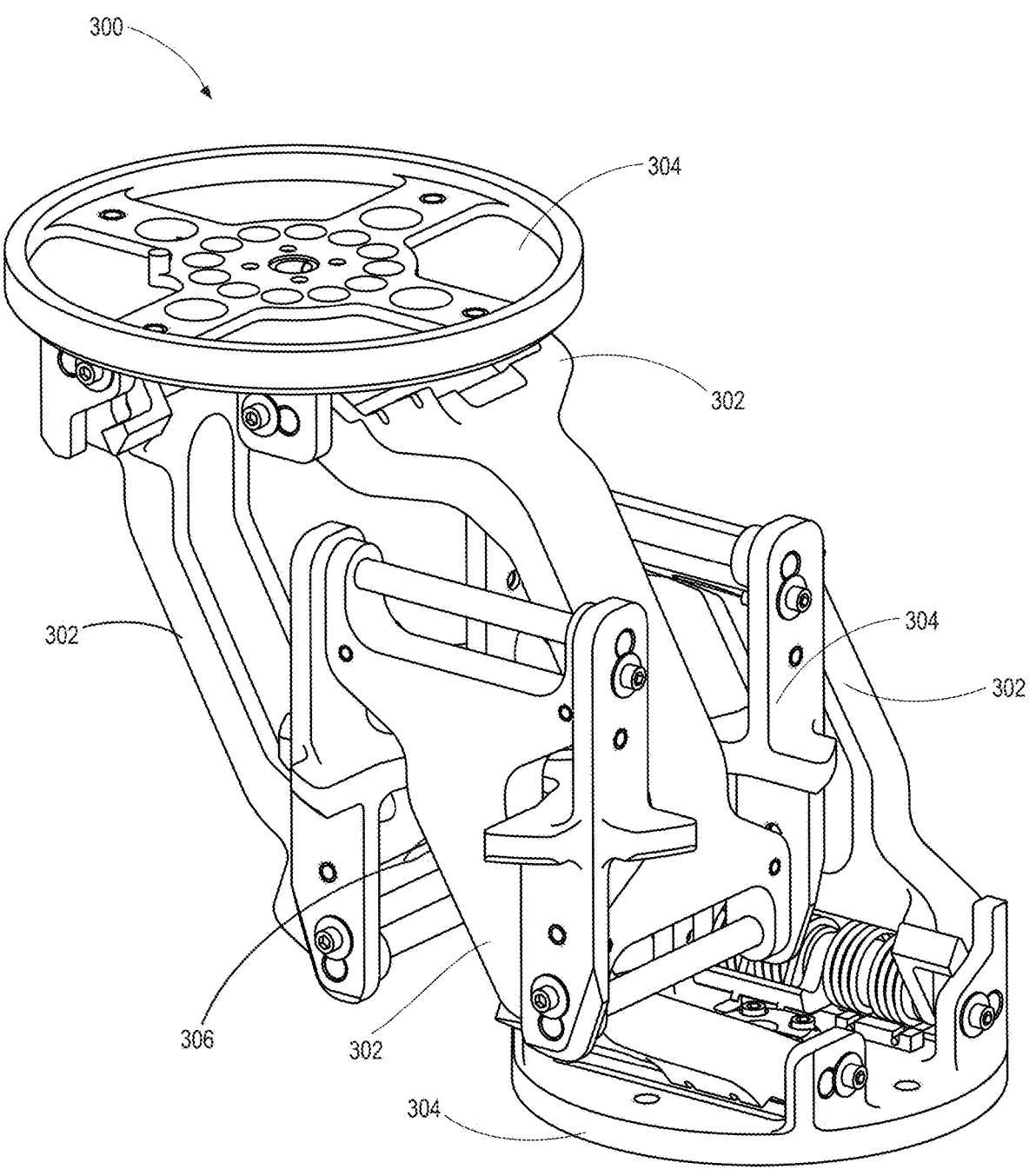
FIG. 8 is an isometric view of a movable platform in a displaced position according to one or more embodiments of the disclosure.

FIGS. 4 and 5 are side views of a movable platform (e.g., movable platform 200) being displaced. For example, FIG. 4 shows a set of the legs 208 (e.g., the legs 208 extending between the first floor 202 and the intermediate floor 206) rotating in a clockwise direction (e.g., about 30 degrees in the clockwise direction as depicted in FIG. 4). For clarity, only one set of the legs 208 is shown as rotating; however, the other set may also rotate in a similar manner in either direction (e.g., as shown in FIG. 8). FIG. 5 shows the set of the legs 208 (rotating in a counterclockwise direction (e.g., about 30 degrees in the counterclockwise direction as depicted in FIG. 5). In additional embodiments, the legs 208 may rotate more or less than 30 degrees in either direction (e.g., ±15, 45, 60, 75, 90 degrees or variations in between).

Figure 6:
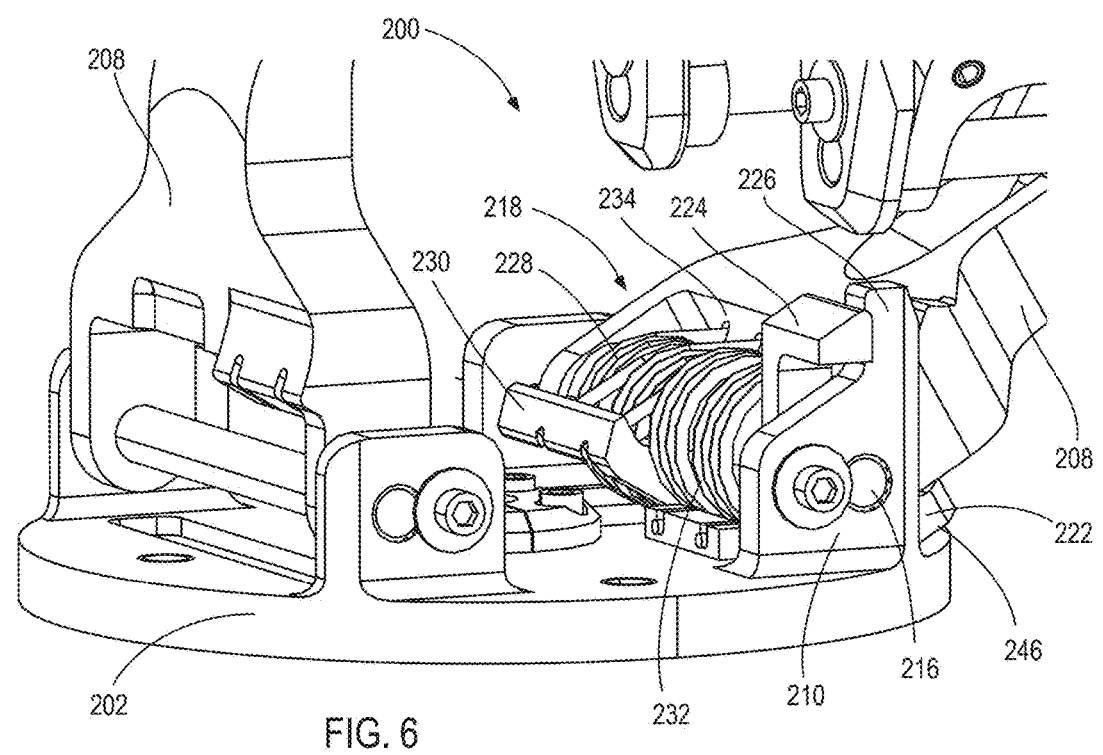
FIGS. 6 and 7 are enlarged views of the movable platform in FIGS. 4 and 5, respectively, in displaced positions.
Figure 7:
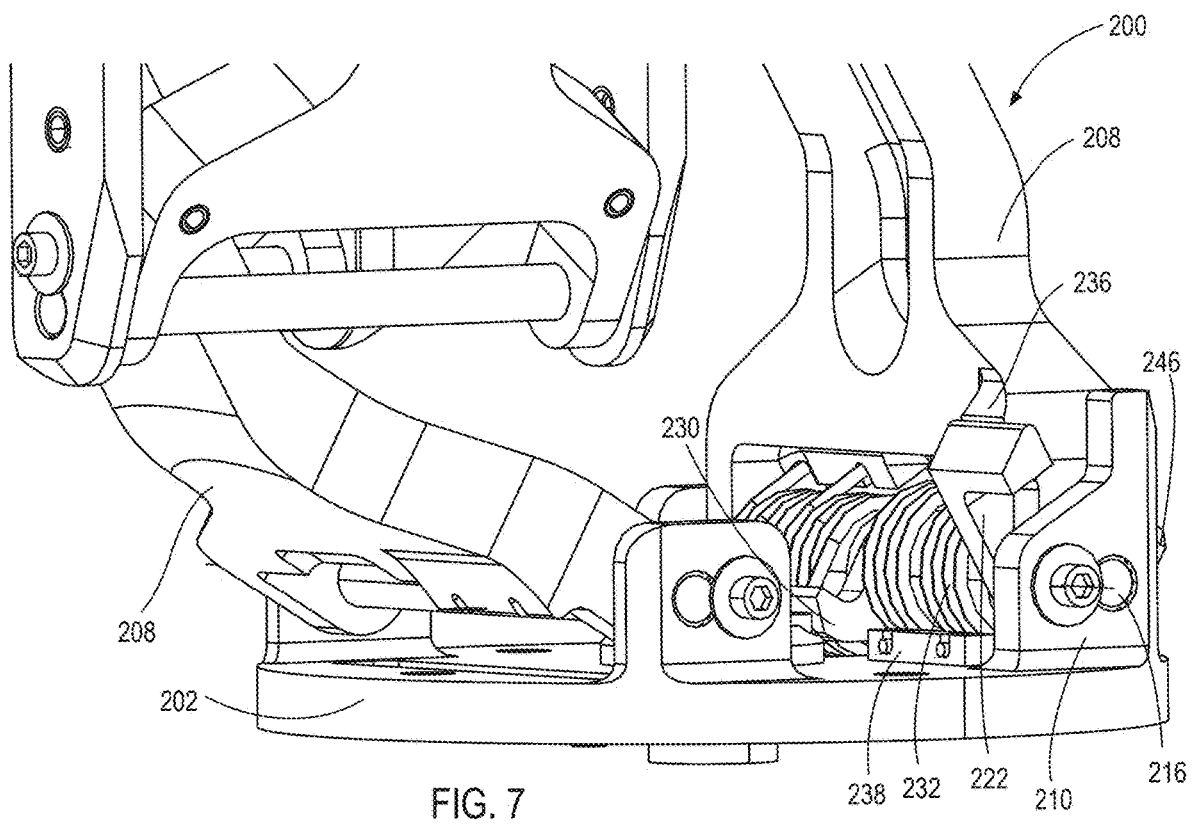

FIGS. 6 and 7 are enlarged views of the movable platform 200 in the positions shown in FIGS. 4 and 5, respectively. FIGS. 6 and 7 are enlarged for clarity to describe the function of a floating stop 222 that may be utilized in unison with (e.g., may be part of) the biasing mechanism 218 in order to minimize any deadband in the movement of the movable platform 200, as is discussed above. Similar to the legs 208, the floating stop 222 may be rotatably coupled to a respective bracket (e.g., bracket 210 via a pinned connection 216).

Referring to FIGS. 4 and 6, as depicted, rotation of the lower set of legs 208 translates both the second floor 204 and the intermediate floor 206 relative to the first floor 202 in a lateral direction that is transverse to (e.g., set across) the longitudinal axis 201. Due to the rotation of the legs 208, the second floor 204 and the intermediate floor 206 will also move along the longitudinal axis 201 (e.g., to move relatively closer or further away from each other). However, as discussed herein, the lateral movement between the floors 202, 204, 206 may be the primary type and/or direction of movement for the movable platform 200 (e.g., constituting a majority of the displacement). In use, the second floor 204 and the intermediate floor 206 translate relative to the first floor 202, which may be coupled to the capture vehicle 10 (FIG. 2), in order to move the second floor 204, which is coupled to a probe assembly 102 (FIG. 2) to move transversely and/or laterally relative to the target spacecraft 11 (FIG. 2) during a docking procedure. Rotation of the upper set of legs 208 (e.g., into or out of the page as depicted in FIG. 4) may further translate the second floor 204 relative to the first floor 202 and the intermediate floor 206 (e.g., as shown in FIG. 8). After displacement, the biasing mechanism 218 may act to force the second floor 204 and the intermediate floor 206 back to being substantially aligned with the longitudinal axis 201 in the initial position. Such alignment may act to align the movable platform 200 with a portion of the target vehicle 11 (e.g., with a centerline of the docking element 18 of the target vehicle 11).

During the rotation of the legs 208, the floating stop 222 may remain in an initial position (e.g., remain stationary) where a stop portion 224 of the floating stop 222 is engaged with a fixed surface of the movable platform 200 (e.g., a fixed portion 226 of one of the brackets 210 creating a hardstop for the floating stop 222 in one direction). Stated in another way, in the movement shown in FIGS. 4 and 6, the floating stop 222 is substantially fixed (e.g., the floating stop 222 does not substantially rotate as the floating stop 222 is secured by interaction between the stop portion 224 and fixed portion 226 of the bracket 210). The leg 208 may apply a force against one or more of the torsion springs 220 (e.g., by twisting torsion spring 228) to overcome the biasing force of the torsion spring 228. As depicted, a first set of ends of the torsion spring 228 may be secured by a first movable bracket portion 230 of the floating stop 222. A second set of end of the torsion spring 228 may be secured to the leg 208 (e.g., at leg bracket 234).

As depicted, a portion of the floating stop 222 (e.g., a second movable bracket portion 246) may act as a hardstop to the leg 208.

Once the force is removed, the torsion spring 228 may return the leg 208 to the initial position.

Referring to FIGS. 5 and 7, as depicted, rotation of lower set of legs 208 translates both the second floor 204 and the intermediate floor 206 relative to the first floor 202 in a counterclockwise direction, similar to the reverse movement in FIGS. 4 and 6 discussed above.

During the rotation of the legs 208 in the counterclockwise direction shown in FIGS. 5 and 7, the floating stop 222 may also rotate in a counterclockwise direction causing the stop portion 224 to move away from the fixed portion 226 of one of the brackets 210. In some embodiments, a hardstop 236 on the leg 208 may contact the stop portion 224 of the floating stop 222 to rotate the floating stop 222.

The leg 208 may apply a force against one or more of the torsion springs 220. For example, force applied to the leg 208 may rotate the floating stop 222 and, in turn, twist torsion spring 232, to overcome the biasing force of the torsion spring 232. As depicted, ends of the torsion spring 232 may be secured by the second movable bracket portion 246 of the floating stop 222 (also shown in FIGS. 5 and 6). A second set of ends of the torsion spring 232 may be secured to the floor 202 (e.g., at floor bracket 238).

When the floating stop 222 rotates a selected amount (e.g., when a portion of the first movable bracket portion 230 contacts the first floor 202), the floating stop 222 acts as a hardstop to the leg 208.

Referring back to FIG. 4, in some embodiments, similar to the above, rotation of the legs 208 may be limited by one or more of the floating stop 222 or the hardstop provided by the movable platform 200. For example, the cutout portion 240 of the intermediate floor 206 may contact the central rib 242 of the leg 208 to provide the hardstop for rotation of the leg 208 and translation of one or more of the floors 202, 204, 206.

As above, once the force is removed, the torsion spring 232 may return the leg 208 to the initial position.

As also discussed above, the floating stop 222 may enable a configuration with substantially little to no backlash when moving between the initial and displaced positions.

FIG. 8 is an isometric view of a movable platform 300 shown with multiple sets of legs 302 rotating the movable platform 300 in a displaced position. In some embodiments, the movable platform 300 may be similar to the movable platforms 24, 122, 200 discussed above.

As depicted, each of floors 304 may move relative to each other along one or more translational degrees of freedom (e.g., along the x-axis, the y-axis, and/or the z-axis) in order to enable the opposing end floors to move laterally relative to each other and then to be biased back into an initial position where the floors 304 are substantially laterally aligned relative to each other. The rotation of the legs 302 between each of the floors 304 may act as a double parallelogram-type movement where each set of legs 302 with opposing floors 304 on either side of the legs 302 define a substantial parallelogram shape. For example, the rotation of the legs 302 between the floors 304 may move the floors 304 relative to each other while maintaining the floors 304 in a substantially parallel orientation and without substantially rotating the floors 304 (e.g., changing the rotational position and/or orientation of the floors 304).

In some embodiments, the movable platform 300 may include one or more electrostatic discharge (ESD) features, such as, for example, ground wires 306 or a braid may extend between the legs 302 and the floors 304.

While certain embodiments discussed herein are directed to the movable platforms having one or more degrees of translational freedom (e.g., three degrees), other embodiments may include other variations of degrees of freedom (e.g., even with some rotational freedom if desired in a select application).

The embodiments of the disclosure described above and illustrated in the accompanying drawing figures do not limit the scope of the disclosure, since these embodiments are merely examples of embodiments of the disclosure. The disclosure is defined by the appended claims and their legal equivalents. Any equivalent embodiments lie within the scope of this disclosure. Indeed, various modifications of the present disclosure, in addition to those shown and described herein, such as alternative useful combinations of the elements described, will become apparent to those of ordinary skill in the art from the description. Such modifications and embodiments also fall within the scope of the appended claims and their legal equivalents. The terminology used herein was chosen to explain the principles of the embodiments, the practical application or technical improvement over technologies found in the marketplace, or to enable others of ordinary skill in the art to understand the embodiments disclosed herein.

What is claimed is:

1. A vehicle capture system for use with a capture vehicle, the vehicle capture system comprising:
   a probe assembly including one or more retention elements for engaging with and securing a target vehicle; and
   a movable platform coupled to at least a portion of the probe assembly, the movable platform comprising:
      a first lateral section coupled with a portion of the capture vehicle;
      a second lateral section coupled with the probe assembly;
      legs extending between the first lateral section and the second lateral section, the legs being rotationally coupled to at least one of the first lateral section or the second lateral section and configured to rotate relative to the at least one of the first lateral section or the second lateral section, wherein rotation of the legs relative to the at least one of the first lateral section or the second lateral section enables the movable platform to move from an initial position to a displaced position as the second lateral section translates relative to the first lateral section; and
      a floating stop configured to rotate when the legs rotate in one rotational direction relative to the at least one of the first lateral section or the second lateral section.

2. The vehicle capture system of claim 1, wherein the floating stop is configured to remain stationary when the legs rotate in another rotational direction relative to the at least one of the first lateral section or the second lateral section, the another rotational direction opposing the one rotational direction.

3. The vehicle capture system of claim 1, further comprising a biasing mechanism configured to bias the movable platform in the initial position.

4. The vehicle capture system of claim 1, wherein the legs exhibit a nested configuration where a first set of the legs longitudinally overlaps with a second set of the legs.

5. A vehicle capture system for use with a capture vehicle, the vehicle capture system comprising:
   a probe assembly including one or more retention elements for engaging with and securing a target vehicle; and
   a movable platform coupled to at least a portion of the probe assembly, the movable platform comprising:
      a first lateral section coupled with a portion of the capture vehicle;
      a second lateral section coupled with the probe assembly;
      legs extending between the first lateral section and the second lateral section, the legs being rotationally coupled to at least one of the first lateral section or the second lateral section and configured to rotate relative to the at least one of the first lateral section or the second lateral section, wherein rotation of the legs relative to the at least one of the first lateral section or the second lateral section enables the movable platform to move from an initial position to a displaced position as the second lateral section translates relative to the first lateral section, wherein the legs exhibit a nested configuration where a first set of the legs longitudinally overlaps with a second set of the legs; and
      a floating stop configured to rotate when the legs rotate in one rotational direction relative to the at least one of the first lateral section or the second lateral section.

6. The vehicle capture system of claim 5, wherein the floating stop is configured to remain stationary when the legs rotate in another rotational direction relative to the at least one of the first lateral section or the second lateral section, the another rotational direction opposing the one rotational direction.

7. The vehicle capture system of claim 5, further comprising a biasing mechanism configured to bias the movable platform in the initial position.

8. A vehicle capture system for use with a capture vehicle, the vehicle capture system comprising:
   a probe assembly including one or more retention elements for engaging with and securing a target vehicle; and
   a movable platform coupled to at least a portion of the probe assembly, the movable platform comprising:
   a first floor configured to be coupled with a portion of the capture vehicle;
   a second floor configured to be coupled with the probe assembly; and
   at least one intermediate floor between the first floor and the second floor, the first floor coupled to the at least one intermediate floor on a first side of the at least one intermediate floor with a first set of legs, the second floor coupled to the at least one intermediate floor on a second side of the at least one intermediate floor with a second set of legs, wherein the first side of the at least one intermediate floor is positioned distal to the first floor and relatively closer to the second floor, and wherein the second side of the at least one intermediate floor is positioned distal to the second floor and relatively closer to the first floor;
   wherein rotation of the first set of legs or the second set of legs enables the movable platform to move from an initial position to a displaced position as the first floor translates laterally relative to the second floor in a direction transverse to a longitudinal axis of the movable platform.

9. The movable platform of claim 8, wherein each of the first set of legs is offset from each of the second set of legs about a longitudinal axis of the movable platform.

10. The movable platform of claim 9, wherein the first set of legs and the second set of legs partially overlap along the longitudinal axis of the movable platform.

* * * * *